(12) United States Patent
Konuma et al.

(10) Patent No.: US 6,954,351 B2
(45) Date of Patent: Oct. 11, 2005

(54) SOLID ELECTROLYTIC CAPACITOR AND METHOD FOR PRODUCING THE SAME

(75) Inventors: Hiroshi Konuma, Nagano (JP); Eiji Komazawa, Nagano (JP); Katsuhiko Yamazaki, Nagano (JP)

(73) Assignee: Showa Denko K.K., Tokyo (JP)

( * ) Notice: Subject to any disclaimer, the term of this patent is extended or adjusted under 35 U.S.C. 154(b) by 229 days.

(21) Appl. No.: 10/343,911

(22) PCT Filed: Aug. 21, 2002

(86) PCT No.: PCT/JP02/08406

§ 371 (c)(1),
(2), (4) Date: Feb. 6, 2003

(87) PCT Pub. No.: WO03/019593

PCT Pub. Date: Mar. 6, 2003

(65) Prior Publication Data

US 2004/0023442 A1 Feb. 5, 2004

Related U.S. Application Data

(60) Provisional application No. 60/315,033, filed on Aug. 28, 2001.

(30) Foreign Application Priority Data

Aug. 22, 2001 (JP) ........................................ 2001-251071

(51) Int. Cl.$^7$ ................................................. H01G 9/00
(52) U.S. Cl. ........................ 361/523; 361/524; 361/528; 29/25.03

(58) Field of Search ................................. 361/523, 524, 361/528–529, 532; 29/25.03

(56) References Cited

U.S. PATENT DOCUMENTS

| | | | | |
|---|---|---|---|---|
| 6,375,688 B1 | * | 4/2002 | Akami et al. | 29/25.03 |
| 6,423,104 B1 | * | 7/2002 | Omori et al. | 29/25.03 |
| 6,449,140 B1 | * | 9/2002 | Sakai et al. | 361/532 |
| 6,462,936 B1 | * | 10/2002 | Fujimoto et al. | 361/525 |

FOREIGN PATENT DOCUMENTS

JP          64-051612          2/1989

* cited by examiner

*Primary Examiner*—Anthony Dinkins
(74) *Attorney, Agent, or Firm*—Sughrue Mion, PLLC

(57) ABSTRACT

A method for producing a solid electrolytic capacitor, involving a step of loading a metal oxide on at least a part of the surface in the anode part of a capacitor element having a valve-acting metal substrate having there on a solid electrolyte, the valve-acting metal substrate having a dielectric film obtained by the electrochemical forming, and a solid electrolytic capacitor obtained by stacking two or more single plate capacitor elements having a metal oxide on at least a part of the surface in the anode part of a capacitor element comprising a valve-acting metal substrate having thereon a solid electrolyte, the valve-acting metal substrate having a dielectric film obtained by the electrochemical forming.

51 Claims, 2 Drawing Sheets

SOLID ELECTROLYTIC CAPACITOR AND METHOD FOR PRODUCING THE SAME

CROSS-REFERENCE TO RELATED APPLICATIONS

This is an application filed pursuant to Section 111 (a) with a claim to priority to Provisional Application Serial No. 60/315,033 filed on Aug. 28, 2001 pursuant to 35 U.S.C. Section 119(e) (1) in accordance with 35 U.S.C. 111(b).

TECHNICAL FIELD

The present invention relates to a solid electrolytic capacitor and a method for producing the capacitor. More specifically, the present invention relates to a solid electrolytic capacitor comprising a valve-acting metal substrate having thereon a dielectric film with the anode part thereof being subjected to welding by resistance heating, wherein the welding failure of the anode part is improved, and also relates to a method for producing the capacitor.

BACKGROUND ART

A solid electrolytic capacitor has a fundamental structure constructed by forming a high-density and uniform oxide dielectric film on the surface of a valve-acting metal previously etched to roughen the surface, such as aluminum, tantalum or titanium, forming, for example, an electrically conducting polymer to work out to be a solid electrolyte on the oxide dielectric film, connecting an anode lead wire to the anode terminal (metal surface area having no solid electrolyte) of the valve-acting metal, and connecting a cathode lead wire to the solid electrolyte through an electrically conducting paste. This structure as a whole is then molded with an insulating resin such as epoxy resin to manufacture a solid electrolytic capacitor.

Among the valve-acting metals described above, aluminum is characterized in that the surface area can be easily enlarged by etching and the oxide film formed on its surface by anodization (electrochemical forming) using the aluminum as the anode can be utilized as a dielectric material, as a result, a small-size and large-capacitance solid electrolytic capacitor can be inexpensively produced as compared with other capacitors. Therefore, the aluminum solid electrolytic capacitor is being widely used.

The etching of aluminum is generally performed by the electrolytic etching in an electrolytic solution containing chlorine ion or the like. By this etching, a large number of pores are formed on the surface and the surface area is enlarged. The radius of the pore formed varies depending on the current applied and the etching time but is approximately from 0.05 to 1 $\mu$m.

The surface including the pores is then subjected to anodization (electrochemical forming). By this electrochemical forming, a high-density and uniform anode oxide film (dielectric film) having a thickness of approximately from 0.005 to 0.1 $\mu$m is formed.

The resulting electrochemically formed aluminum substrate is cut into a predetermined size of a solid electrolytic capacitor. At this time, a protruded portion (bur) remains at the cut end part, however, this exposed aluminum (ground metal) portion is again electrochemically formed as it is to form an anode oxide film (dielectric film) on the cut end part.

On the oxide dielectric film, an electrically conducting polymer is formed to work out to be a solid electrolyte. Then, an anode lead wire is connected or bonded to the anode terminal (metal surface area having no solid electrolyte) of the valve-acting metal using, for example, resistance welding, laser radiation, contact pressure of a caulking or the like, or an electrically conducting adhesive.

However, the bonding using an electrically conducting adhesive takes time in coating the viscous adhesive. Particularly, in the case of stacking and bonding a plurality of capacitor elements, the application is cumbersome. The mechanical bonding using a caulking is not suitable for the case where the bonding portion is small, and the bonding is unstable. The bonding by laser welding has a problem in that the equipment therefor costs highly.

The resistance welding is a method of performing the bonding by fusing a metal in the welding portion utilizing the heat generation (resistance heating) of a dielectric film due to electric resistance. In the case of a material having high electrical conductivity such as aluminum, this resistance is small and heat is less generated. Moreover, because of good thermal conductivity, the bonding portion cannot be satisfactorily fused. Furthermore, in the case of an aluminum foil for low voltage less than 20 V, the dielectric film obtained is thin and has a low resistance value as compared with an aluminum foil for high voltage foil, therefore, the resistance heating hardly occurs. Accordingly, it is difficult to find out good conditions for welding and a problem of connection failure with the anode lead is present.

DISCLOSURE OF THE INVENTION

The object of the present invention is to provide a method for producing a solid electrolytic capacitor, where when an electrically conducting polymer to work out to be a solid electrolyte is formed on an oxide dielectric film and the anode part of a valve-acting metal substrate on the same surface and an anode leadwire are connected by resistance welding, the welding failure is reduced and the production yield is improved. The present invention also provides a solid electrolytic capacitor produced by this production method.

As a result of extensive investigations to solve the above-described problems, the present inventors have found that when electrically insulating inorganic particles of a metal oxide are adhered by coating, spraying or the like to at least a part of the surface in the anode part of an electrochemically formed foil and then, resistance welding is performed using an electrical energy, surprisingly, the bonding strength between the anode part of the electrochemically formed foil and the anode lead is improved, whereby the production yield of capacitor is elevated and the dispersion in the properties among individual capacitors is reduced.

More specifically, the present invention provides the following production method of the solid electrolytic capacitor and solid electrolytic capacitor.

1. A method for producing a solid electrolytic capacitor, comprising a step of loading a metal oxide on at least a part of the surface in the anode part of a capacitor element comprising a valve-acting metal substrate having there on a solid electrolyte, the valve-acting metal substrate having a dielectric film obtained by the electrochemical forming, and a step of stacking and bonding two or more capacitor elements described above.

2. A method for producing a solid electrolytic capacitor, comprising a step of loading a metal oxide on at least a part of the surface in the anode part of a capacitor element comprising a valve-acting metal substrate having there on a solid electrolyte, the valve-acting metal substrate having a dielectric film obtained by the electrochemical forming, and a step of subsequently stacking and bonding two or more capacitor elements described above.

3. A method for producing a solid electrolytic capacitor, comprising a step of loading a metal oxide on at least a part of the surface in the anode part of a capacitor elements comprising a valve-acting metal substrate having thereon a solid electrolyte, the valve-acting metal substrate having a dielectric film obtained by the electrochemical forming, and a step of stacking two or more capacitor elements described above, mounting these elements on a lead frame and then, bonding the elements to the lead frame.
4. The method for producing a solid electrolytic capacitor as described in anyone of 1 to 3 above, wherein the electrochemical forming is performed at a voltage of less than 20 V.
5. The method for producing a solid electrolytic capacitor as described in any one of 1 to 3 above, wherein the valve-acting metal substrate is one member selected from the group consisting of aluminum, tantalum, titanium, niobium, and an alloy thereof.
6. The method for producing a solid electrolytic capacitor as described in any one of 1 to 5 above, wherein the valve-acting metal substrate is an electrochemically formed aluminum foil or plate.
7. The method for producing a solid electrolytic capacitor as described in 3 above, wherein the lead frame has a low-melting point metal plating layer whose melting point is lower than that of the valve-acting metal having a thickness in the range of 0.1 to 100 $\mu$m on the surface and the anode part of the capacitor elements is mounted on this plating portion.
8. The method for producing a solid electrolytic capacitor as described in 7 above, wherein the lead frame is made of a copper or copper alloy based material.
9. The method for producing a solid electrolytic capacitor as described in 7 above, wherein the low-melting point metal plating is composed of a substrate nickel plating and a surface tin plating.
10. The method for producing a solid electrolytic capacitor as described in any one of 1 to 3 above, wherein the metal oxide is a metal oxide of the valve-acting metal constituting the valve-acting metal substrate, and is electrically insulating.
11. The method for producing a solid electrolytic capacitor as described in any one of 1 to 3 above, wherein the metal oxide is a material other than a metal oxide of the valve-acting metal constituting the valve-acting metal substrate, and is electrically insulating.
12. The method for producing a solid electrolytic capacitor as described in 10 or 11 above, wherein the metal oxide has an average primary particle size of 100 $\mu$m or less.
13. The method for producing a solid electrolytic capacitor as described in any one of 10 to 12 above, wherein the metal oxide is at least one member selected from the group consisting of alumina, zirconia, titania, zircon, magnesia.spinel, silicon dioxide, and a composite material thereof.
14. The method for producing a solid electrolytic capacitor as described in any one of 10 to 13 above, wherein the metal oxide forms a metal oxide layer having a thickness in the range of 0.1 to 500 $\mu$m on at least a part of the surface in the anode part of a capacitor element.
15. A single plate capacitor element having a metal oxide on at least a part of the surface in the anode part of a capacitor element comprising a valve-acting metal substrate having thereon a solid electrolyte, the valve-acting metal substrate having a dielectric film obtained by the electrochemical forming.
16. A solid electrolytic capacitor obtained by stacking two or more single plate capacitor elements described in 15 above.
17. A solid electrolytic capacitor obtained by the production method of a solid electrolytic capacitor described in any one of 1 to 14 above.
18. The solid electrolytic capacitor as described in 16 or 17 above, wherein the solid electrolyte comprises a $\pi$-electron conjugate polymer.
19. The solid electrolytic capacitor as described in 18 above, wherein the $\pi$-electron conjugate polymer is a polymer obtained from a heterocyclic 5-membered ring compound.
20. The solid electrolytic capacitor as described in 19 above, wherein the heterocyclic 5-membered ring compound is at least one member selected from the group consisting of pyrrole, thiophene, furan, isothianaphthene, 1,3-dihydroisothianaphthene and substitution derivatives thereof.
21. The solid electrolytic capacitor as described in 19 above, wherein the heterocyclic 5-membered ring compound is at least one member selected from the group consisting of 3,4-ethylenedioxythiophene and 1,3-dihydroisothianaphthene.

MODE FOR CARRYING OUT THE INVENTION

Figure 1:
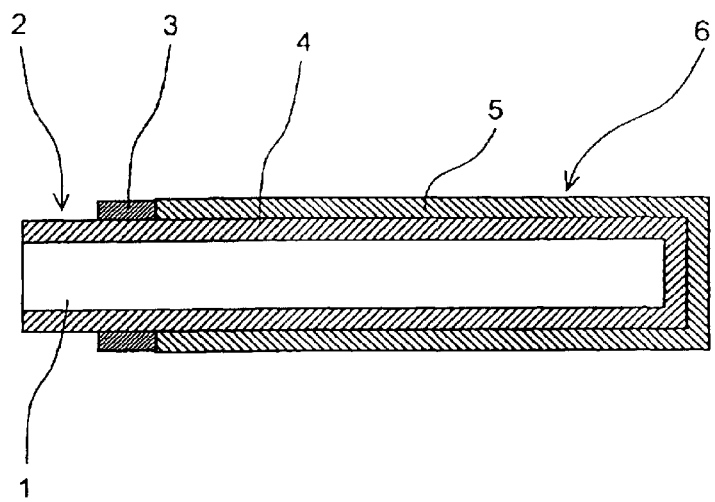
FIG. 1 is a cross-sectional view showing one example of the solid electrolytic capacitor element (single plate) of the present invention, wherein 1 to 6 indicate aluminum foil, anode part, masking material, dielectric film, solid electrolyte layer and cathode part in order.

The present invention is described in detail below referring to the drawings appropriately.

[Valve-Acting Metal]

The valve-acting metal used for solid electrolytic capacitor in the present invention has a foil or plate shape and is obtained by forming an oxide layer of dielectric (4) on a metal such as aluminum, tantalum, titanium, niobium or zirconium. The valve-acting metal passes a current only in one direction but scarcely passes a current in the opposite direction and therefore, is called a metal having so-called valve action. The valve-acting metal usually comprises a material capable of forming an anode oxide film, or an alloy material thereof. Among these, an aluminum foil (plate) is excellent in view of profitability and therefore, is widely used in practice.

Hereinafter, the present invention is described based on a solid electrolytic capacitor using a formed aluminum foil as the valve-acting metal. The shape of this formed aluminum foil is not limited, however, the thickness is 40 to 150 $\mu$m and as a plate-like element unit, a foil having a width of about 1 to 30 mm and a length of about 1 to 30 mm, preferably a width of 2 to 20 mm and a length of 2 to 20 mm, more preferably a width of 2 to 5 mm and a length of 2 to 6 mm, is used.

The aluminum solid electrolytic capacitor has been heretofore produced by cutting a commercially available formed aluminum foil having thereon an aluminum oxide dielectric film into a predetermined shape necessary for a solid electrolytic capacitor and then, subjecting the aluminum ground metal portion on the cut face to an electrochemical forming treatment of the cut end part. In the electrochemical forming of the cut end part, an electrolytic solution of an acid and/or a salt thereof, for example, an electrolytic solution containing at least one of phosphoric acid, oxalic acid, sulfuric acid and the like, is used and a constant-current electrochemical forming is performed using the core part of the formed substrate as the anode under the conditions such that the concentration of the electrolytic solution is from 0.1 to 30% by mass, the temperature is from 0 to 80° C., the current density is from 0.1 to 1,000 mA/cm$^2$ and the electrochemical forming time is 100 minutes or less. The conditions are more preferably selected such that the concentration of the electrolytic solution is from 1 to 20% by mass, the temperature is from 20 to 50° C., the current density is from 1 to 400 mA/cm$^2$ and the electrochemical forming time is 60 minutes or less.

The above-described various conditions in the electrochemical forming, such as electrolytic solution, concentration of electrolytic solution, temperature, current density and electrochemical forming time, can be freely selected insofar as the dielectric film already formed on the surface of the formed substrate is not collapsed or deteriorated by the conditions.

[Solid Electrolyte]

In the present invention, an electrically conducting polymer is formed as a solid electrolyte layer (5) on the formed aluminum substrate.

The electrically conducting polymer for forming the solid electrolyte used in the solid electrolytic capacitor of the present invention is not limited, however, an electrically conducting polymer having a $\pi$ electron-conjugate structure is preferred and examples thereof include electrically conducting polymers containing, as a repeating unit, a structure represented by a compound having a thiophene skeleton, a compound having a polycyclic sulfide skeleton, a compound having a pyrrole skeleton, a compound having a furan skeleton, or the like.

Out of the monomers used as a starting material of the electrically conducting polymer, examples of the compound having a thiophene skeleton include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds maybe a compound generally available on the market or may be prepared by a known method (for example, the method described in *Synthetic Metals*, Vol. 15, page 169 (1986)).

Examples of the compound having a polycyclic sulfide skeleton include compounds having a 1,3-dihydropolycyclic sulfide (also called 1,3-dihydrobenzo[c]thiophene) skeleton and compounds having a 1,3-dihydronaphtho[2,3-c]thiophene skeleton. Furthermore, compounds having a 1,3-dihydroanthra[2,3-c]thiophene skeleton and compounds having a 1,3-dihydronaphthaceno[2,3-c]thiophene skeleton may be used. These compounds may be prepared by a known method, for example, the method described in JP-A-8-3156 (U.S. Pat. No. 5,530,139); the term "JP-A" as used herein means an "unexamined published Japanese patent application".

In addition, for example, compounds having a 1,3-dihydronaphtho[1,2-c]thiophene skeleton, 1,3-dihydrophenanthra[2,3-c]thiophene derivatives, compounds having a 1,3-dihydrotriphenylo[2,3-c]thiophene skeleton, and 1,3-dihydrobenzo[a]anthraceno[7,8-c]thiophene derivatives may also be used.

In some compounds, nitrogen or N-oxide is arbitrarily contained in the condensed ring. Examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole, however, the present invention is not limited thereto. These compounds may be a compound available on the market or may be prepared by a known method.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds may be a compound available on the market or may be prepared by a known method.

The polymerization may be electrolytic polymerization, chemical oxidation polymerization or a combination thereof. Also, a method of forming on a dielectric film a solid electrolyte which is not an electrically conducting polymer, and then forming an electrically conducting polymer by the above-described polymerization method may be used.

Examples of the method which can be used for forming an electrically conducting polymer include a method where a dielectric film is coated with a 3,4-ethylenedioxythiophene monomer and an oxidizing agent each preferably in the form of a solution separately one after another or simultaneously to form an electrically conducting polymer (see, JP-A-2-15611 (U.S. Pat. No. 4,910,645) and JP-A-10-32145 (U.S. Pat. No. 6,229,689)).

In the electrically conducting polymer, a compound having a doping ability (dopant) is generally used. The dopant may be added to either a monomer solution or an oxidizing agent solution. An organic sulfonic acid metal salt where the dopant and the oxidizing agent are the same compound may also be used. The dopant is preferably an arylsulfonate-base dopant and examples thereof include salts of benzenesulfonic acid, toluenesulfonic acid, naphthalenesulfonic acid, anthracenesulfonic acid or anthraquinonesulfonic acid.

[Solid Electrolytic Capacitor]

Figure 2:
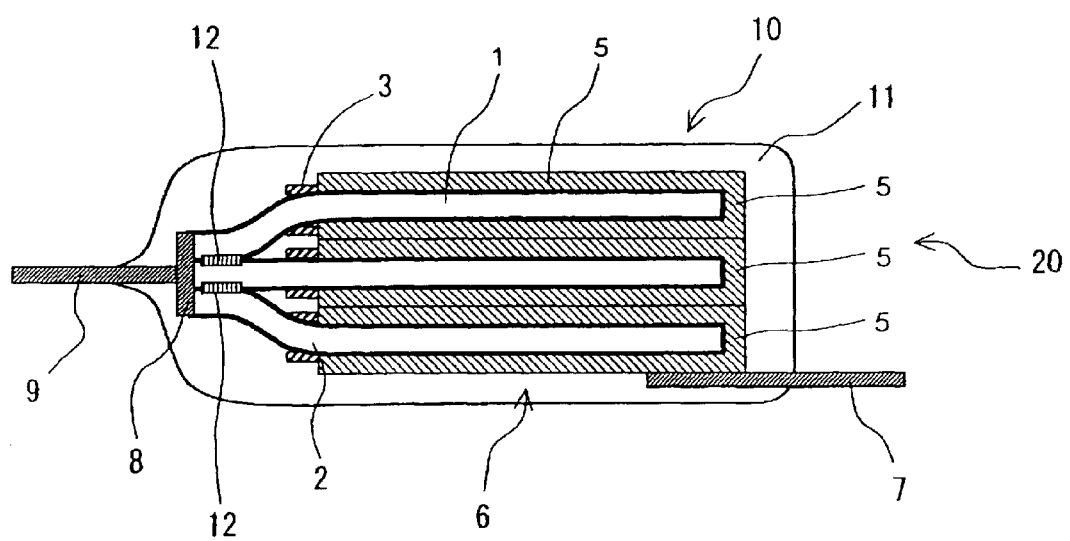
FIG. 2 is a cross-sectional view showing one example of the multilayer solid electrolytic capacitor obtained by stacking the solid electrolytic capacitor element (single plate) of the present invention, wherein 7 to 12 indicate cathode lead terminal, lead frame, anode lead terminal, multilayer solid electrolytic capacitor, insulating resin and metal oxide in order.
Figure 3:
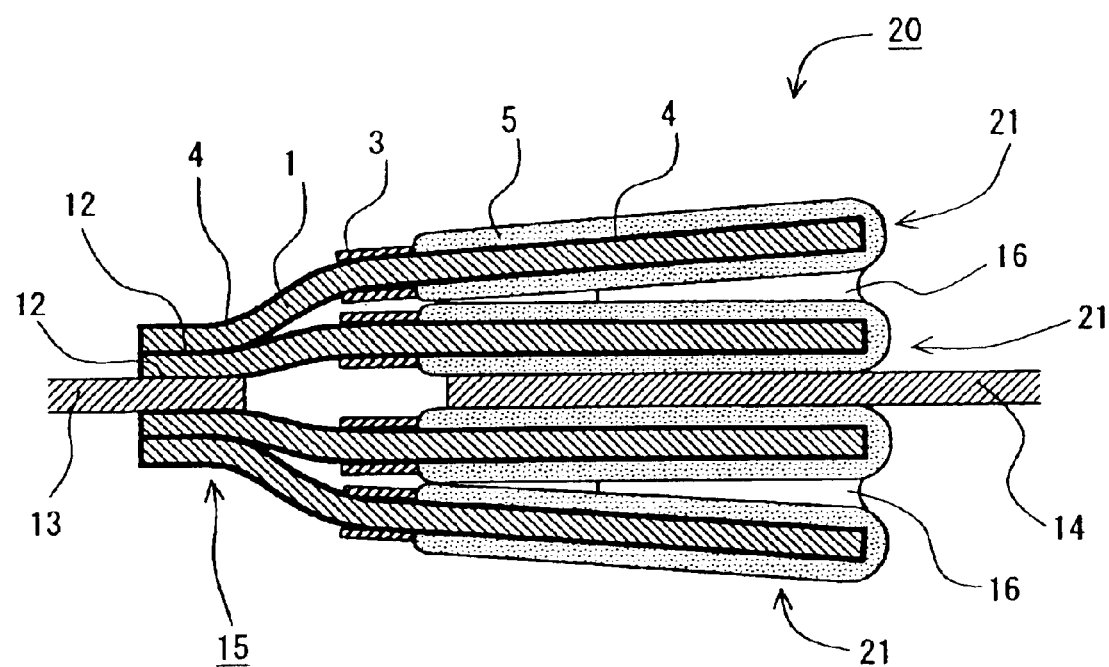
FIG. 3 is a cross-sectional view showing one example of the multilayer (four sheets-stacked) solid electrolytic capacitor element of the present invention, wherein 13 to 16 indicate anode lead frame, cathode lead frame, end part in the anode side, and electrically conducting adhesive in order, 20 indicates multilayer capacitor element and 21 indicates single plate capacitor element.

In order to attain good electric contact with the cathode lead terminal (7), an electrically conducting layer is preferably provided on the solid electrolyte layer (5) by applying an electrically conducting paste such as carbon paste or metal powder-containing paste, or by plating (see, FIG. 1, FIG. 2). Subsequently, a cathode lead terminal (7) is connected to the cathode part (6) and then an outer jacket is applied using, for example, resin molding, resin case, metal-made jacket case or resin dipping, whereby a solid electrolytic capacitor for various uses can be completed.

The multilayer solid electrolytic capacitor of the present invention is generally used as a multilayer capacitor where at least two sheets of capacitor elements are stacked. In the multilayer solid electrolytic capacitor, edge corner parts of the lead frame (8) may be chamfered, more specifically, the lead frame may have flattened or rounded by slightly shaving these parts.

The opposing cathode bonding part and anode bonding part of the lead frame may also be allowed to serve as the lead terminals (7) and (9).

The material for the lead frame is not particularly limited insofar as it is a material commonly used. However, the lead frame is preferably constituted by a copper material (for example, Cu—Ni, Cu—Ag, Cu—Sn, Cu—Fe, Cu—Ni—Ag, Cu—Ni—Sn, Cu—Co—P, Cu—Zn—Mg or Cu—Sn—Ni—P alloy) or a material of which surface is plated with a copper material, because the resistance can be reduced by designing the shape of the lead frame or good workability can be attained in chamfering the lead frame.

The lead frame is preferably a lead frame where the bonding part of the anode lead frame is plated with a low-melting metal. For this low-melting metal plating, a metal or alloy having a melting point lower than that of the valve-acting metal is used. In general, the plating material for the lead frame is mainly silver and other than this, gold, nickel, copper, tin, solder (Sn—Pb alloy) or the like is used. However, in the case of using a formed aluminum foil as the valve-acting metal, tin (melting point: 232° C.), zinc (melting point: 420° C.), solder (6Sn-4Pb) or other low-melting alloy (fusible alloy) each having a melting point lower than that of aluminum (melting point: 660° C.) is used. This plating layer may have any thickness insofar as a sufficiently high bonding strength between the valve-acting metal and the lead frame can be obtained. The thickness is generally on the order of 0.1 to 100 $\mu$m, preferably from 1 to 60 $\mu$m. The plating layer may also be formed by applying substrate plating and covering it with surface plating.

In considering the environmental load, the plating metal preferably has a small lead or lead compound content and suitable examples thereof include a plating layer where surface plating of tin is applied on substrate plating of nickel.

FIG. 2 is a cross-sectional view of a multilayer solid electrolytic capacitor. The multilayer solid electrolytic capacitor (10) is obtained by connecting a lead terminal (9) to the lead frame (8) bonded to the anode part (2), connecting a lead wire (7) to the cathode part (6) consisting of a solid electrolyte layer (5), a carbon paste layer and a metal powder-containing electrically conducting layer, and molding the whole with an insulating resin (11) such as epoxy resin.

At this time, the anode part is bonded by welding using resistance heating. However, if the bonding of anode part is performed by the above-described welding method, the yield of the solid electrolytic capacitor is not stabilized and dispersion is caused in the capacitor properties.

In the capacitor element where a solid electrolyte is provided on a valve-acting metal substrate having a dielectric film obtained by the electrochemical forming, the anode part (2) is a part to be bonded with a lead frame and on the surface of this part, a solid electrolyte is not formed.

[Metal Oxide]

The present inventors have found that in the method of producing a capacitor by forming a solid electrolyte on a valve-acting metal having a dielectric film formed by the electrochemical forming and thereon, further coated with an electrically conducting paste, when the anode substrates of a plurality of capacitor elements are bonded by previously allowing electrically insulating metal oxide particles to be supported (to intervene) on the dielectric surface in the anode part of a formed foil by means of coating or spraying and then performing the resistance welding, the adhesion strength between the anode part of the formed foil and the anode lead part is improved, as a result, the yield in production (simply referred to as "yield") of the capacitor is elevated and the dispersion in the properties among individual capacitors is reduced.

The reason why the yield of solid electrolytic capacitor is elevated is not clearly known, however, when the anode part welded by the technique of the present invention is analyzed, it is revealed that the anode welded part is firmly bonded (welded) to the lead wire part as compared with the anode part welded under the same conditions except for not forming electrical insulating inorganic particles on the formed foil, and also that the anode welding method of the present invention can be stably performed in view of yield.

The inorganic particle for use in the present invention may be any inorganic particle insofar as it can be applied to a formed foil by the method such as coating or spraying and can be stably present on the foil surface at room temperature. For example, the material therefor may be an oxide of a valve-acting metal such as aluminum, tantalum, niobium, titanium, zirconium or an alloy thereof, or a silicon oxide.

The metal oxide for use in the present invention may be any metal oxide insofar as it is electrically insulating and examples thereof include $Al_2O_3$ (alumina), $ZrO_2$ (zirconia), $TiO_2$ (titania), $ZrSiO_4$ (zircon), $MgAl_2O_4$ (magnesia.spinel), $SiO_2$ (silicon dioxide), $SiO_2$—PbO, $Al_2O_3$—$AlPO_4$, $Na_2O_3$—$NaSiO_3$ and $SiO_2$—$TiO_2$—$Na_2O$—$B_2O_3$. Metal oxides which are fused by resistance heating are preferred and alumina (melting point: 1,970 to 2,030° C.), zirconia (melting point: 2,700 to 2,850° C.), titania (melting point: 1,840° C.), zircon (melting point: 2,550° C.) and magnesia.spinel (melting point: 2,135° C.) are known to have a melting point. Among these, more preferred are $Al_2O_3$ (alumina), $ZrO_2$ (zirconia), $TiO_2$ (titania) and $ZrSiO_4$ (zircon).

The shape of inorganic particle is not necessarily limited, however, a large particle stays in the surface layer of formed foil and unstable welding is liable to result. Accordingly, the majority of the inorganic particles preferably have a particle size smaller than the pore size of etched foil. The particles having a particle size smaller than the pore size of etched foil preferably occupy 60% or more, more preferably 80% or more.

A half or more of inorganic particles suitably have an average primary particle size of 100 $\mu$m or less, preferably 10 $\mu$m or less, more preferably 2 $\mu$m or less.

The coating, spraying or the like on the welding part of formed foil is performed using a dispersion solution of particles. Usually, the surface of the formed foil is hydrophobic due to micropores and readily repels water and the surface is sometimes not wetted by an aqueous solution containing particles, therefore, a water-soluble organic solvent can be used preferably in a small amount. The water-soluble organic solvent used here is a solvent having affinity for water and although this solvent is not particularly limited, examples thereof include alcohols (e.g., methanol, ethanol, n-propyl alcohol, isopropyl alcohol, butanol, 1,2,6-hexanetriol, glycerin), ketones (e.g., acetone), ethers (e.g., tetrahydrofuran, 1,4-dioxane), amides (e.g., N,N-dimethylformamide, N-methylformamide, N,N-dimethylacetamide, N-methylpropionamide), pyrrolidinones (e.g., 1-methyl-2-pyrrolidinone, 2-pyrrolidinone, ∈-caprolactam, 1,3-dimethyl-2-imidazolidinone) and glycols (e.g., ethylene glycol, propylene glycol, butylene glycol, trimethylene glycol, hexylene glycol, diethylene glycol, dipropylene glycol, pentanediol, polyethylene glycol). Among these, alcohols such as methyl alcohol, ethyl alcohol and isopropyl alcohol, and ketones such as acetone and methyl ethyl ketone, are preferred from the standpoint of improving the wettability.

In the present invention, the solvent for containing inorganic particles may be water, one of the above-described compounds, a mixed solution of two or more of those compounds combined at an arbitrary ratio, or a mixed solution of the compound with water.

The concentration of the dispersion solution is not limited, however, the metal oxide is suitably contained in an amount of 0.05 to 60% by mass, preferably from 0.1 to 10% by mass, more preferably from 0.1 to 1% by mass. If the concentration is less than 0.05% by mass, the intended effect cannot be obtained, whereas if it exceeds 60% by mass, the dispersion loses the balance to cause increase of precipitates and render the solution non-uniform, and also, a big spark is generated at the time of welding, which is not preferred in view of safety.

In the dispersion solution, a dispersant (for example, condensed sodium naphthalenesulfonate, ionic surfactant, water-soluble resin or nonionic surfactant) may be used, if desired. Or, the surface of metal oxide particle maybe chemically modified by a sol-gel method to elevate the dispersibility or the affinity for a liquid medium.

This dispersion solution may contain, if desired, an antiseptic.antifungal (for example, sodium dehydroacetate), a rust preventive (for example, ammonium thioglycolate), a defoaming agent, a viscosity controlling agent, a penetrant (for example, lower alcohol, carbinols or surfactant) and a nozzle drying inhibitor (for example, gluconolactone or sorbitol).

The metal oxide layer can be formed by a coating method such as brush coating, screen printing or stamping with a sponge material, a spray method or a dipping method. Among them, screen printing, stamping with a sponge material and a dipping method are preferable.

The metal oxide layer formed on the surface of the anode part may cover the anode part entirely or partially. It is sufficient if the metal oxide layer is formed in the region large enough to give a sufficiently high bonding strength between the anode part and the anode part and/or between the anode part and the lead frame. In general, it is appropriate that 70% or more, preferably 80% or more of the entire surface of the anode part is covered with the metal oxide layer.

Moreover, the thickness of the metal oxide layer may have any thickness insofar as a sufficiently high bonding strength between the anode part and the anode part and/or between the anode part and the lead frame can be obtained. The thickness is generally from 0.1 to 500 $\mu$m, preferably from 1 to 200 $\mu$m, more preferably from 5 to 100 $\mu$m.

The resistance welding using an electrical energy includes spot welding, seam welding, projection welding, butt welding, flash butt welding and high frequency resistance welding. In the present invention, the resistance welding can be performed according to a usual application procedure.

Welding conditions can be appropriately determined according to the kind of valve-acting metal, the shape (e.g., thickness, dimension) of foil, the number of sheets of element stacked, the construction material of lead frame, the kind of metal oxide, the amount of coating spraying of metal oxide, and the like. For example, when a copper-made lead frame is used and thereon, from 4 to 8 capacitor elements each comprising a low-voltage aluminum foil (rated film withstand voltage: 4 Vf) having a thickness of about 100 $\mu$m are stacked and bonded, the welding can be performed, in the case of a capacitor-type spot welding machine, by pressing an electrode to the bonding portion under a pressure of about 2 to about 8 kg and passing a current having a peak current of 2 to 5 kA for a current passing time of 1 to 10 ms according to the application pattern of middle pulse with an energy of about 6.5 to about 11 W·s.

BEST MODE FOR CARRYING OUT THE INVENTION

The present invention is described in greater detail below by referring to representative Examples. These are mere illustrative Examples and the present invention is not limited thereto.

EXAMPLE 1

A formed aluminum foil (100LJ19B4Vf, trade name, produced by Japan Capacitor Industrial Co., Ltd. (JCC)) (rated film withstand voltage: 4 Vf) was cut and a masking material (heat resistant resin) (3) was circumferentially formed 1 mm in width on both surfaces and at both ends of the foil to divide the foil into two parts from the distal end. Thus, the foil was divided into the cathode part (3 mm×4 mm)(6) and the anode part(2), and the cathode part assigned to the divided portion in the distal end side was subjected to electrochemical forming in an aqueous 5% by mass oxalic acid solution at 25° C. for 120 seconds and then washed with water.

Subsequently, the foil was heat-treated at 350° C. for 3 minutes and then electrochemically formed using an aqueous 10% by mass ammonium adipate solution as the electrolytic solution under the conditions such that the temperature was 55° C., the voltage was 4 V, the current density was 5 mA/cm$^2$ and the current passing time was 10 minutes.

Thereafter, the cathode part was dipped in 1 mol/liter of an isopropyl alcohol solution of 3,4-ethylenedioxythiophene, left standing for 2 minutes, then dipped in a mixed aqueous solution of an oxidizing agent (1.8 mol/liter of ammonium persulfate) and a dopant (0.06 mol/liter of sodium anthraquinone-2-sulfonate), and left standing at 45° C. for 5 minutes to allow the oxidation polymerization to proceed.

This operation of performing the impregnation step and the polymerization step was repeated 25 times to form a dopant-containing electrically conducting polymer layer inside fine pores of dielectric film(4) in the aluminum foil. The aluminum foil having formed thereon the electrically conducting polymer layer was washed with hot water at 50° C. and then dried at 100° C. for 30 minutes to form a solid electrolyte layer(5). On this solid electrolyte layer, a carbon paste and a silver paste were sequentially stacked to form an electrically conducting layer, thereby obtaining a capacitor element.

The surface of the anode part was coated with a dispersion solution (water:methanol=95:5) of 0.1% by mass alumina (containing particles having a primary particle size of 10 $\mu$m or less in a proportion of 80% or more) (12) by a brush and dried for 60 seconds to form an alumina layer (5 μm). Subsequently, two sheets of elements were superposed on the cathode sides and were bonded with a silver paste. 50 Units of the thus-manufactured specimen were prepared. Out of these, 25 units each were subjected to resistance welding (energy: 5.5 W·s) of the anode portion to bond the anode parts. In order to examine the bonding state of the bonded portion, the elements were peeled off and observed by a microscope. The results were evaluated by the following four-stage rating.

⊚: Foil is ruptured.

○: Hardly peelable even when pulled with a hand.

Δ: Despite welding trace, easily peelable when pulled with a hand.

X: No welding trace.

As seen from the results shown in Table 1, all specimens were hardly peeled off and rated ○.

The remaining 25 units were tested as follows. The end part surface of a copper-made lead frame (13) in the anode side was subjected to substrate plating with nickel and thereon, surface plating of tin was applied. On this lead frame, two sheets of capacitor element were stacked such that the anode portion (15) was superposed on and tightly contacted with the plating portion of the lead frame. The portion in tight contact was subjected to resistance welding (energy: 5.5 W·s), thereby bonding the anode parts and the lead frame. Thereafter, the element as a whole was molded with a resin for molding (epoxy resin) to complete a solid electrolytic capacitor. After aging this capacitor at 2 V and 105° C. for 1 hour, the electrostatic capacitance and the leakage current property were measured.

The average electrostatic capacitance and the dispersion (deviation) thereof were calculated on 25 specimens. The results are shown in Table 2.

In the evaluation of the leakage current property, the leakage current value was measured 1 minute after the application of a rated voltage (2 V) to the capacitor and a specimen having a measured value less than the threshold value of 0.03 CV was judged acceptable. The acceptance was evaluated as an LC yield (%).

EXAMPLE 2

50 Capacitor elements were manufactured in the same manner as in Example 1 except for using a 0.5% by mass alumina (the property of alumina particle was the same as in Example 1) dispersion solution in place of the 0.1% by mass alumina dispersion solution in Example 1. These specimens were evaluated in the same manner as in Example 1. The results obtained are shown in Tables 1 and 2.

EXAMPLE 3

50 Capacitor elements were manufactured in the same manner as in Example 1 except for using a 1% by mass zirconia (containing particles having a primary particle size of 2 μm or less in a proportion of 70% or more) dispersion solution in place of the 0.1% by mass alumina dispersion solution in Example 1. These specimens were evaluated in the same manner as in Example 1. The results obtained are shown in Tables 1 and 2.

EXAMPLE 4

50 Capacitor elements were manufactured in the same manner as in Example 1 except for using a 3.0% by mass zirconia (the property of zirconia was the same as in Example 3) dispersion solution in place of the 0.1% by mass alumina dispersion solution in Example 1. These specimens were evaluated in the same manner as in Example 1. The results obtained are shown in Tables 1 and 2.

EXAMPLE 5

50 Capacitor elements were manufactured in the same manner as in Example 1 except for using a 0.05% by mass titania (containing particles having a primary particle size of 0.5 μm or less in a proportion of 80% or more) dispersion solution in place of the 0.1% by mass alumina dispersion solution in Example 1. These specimens were evaluated in the same manner as in Example 1. The results obtained are shown in Tables 1 and 2.

EXAMPLE 6

50 Capacitor elements were manufactured in the same manner as in Example 1 except for using a 0.2% by mass titania (the property of titania was the same as in Example 5) dispersion solution in place of the 0.1% by mass alumina dispersion solution in Example 1. These specimens were evaluated in the same manner as in Example 1. The results obtained are shown in Tables 1 and 2.

EXAMPLE 7

50 Capacitor elements were manufactured in the same manner as in Example 1 except that a 0.2% by mass titania (the property of titania was the same as in Example 5) dispersion solution was used in place of the 0.1% by mass alumina dispersion solution in Example 1 and the anode part was dipped in the titania dispersion solution in place of coating with the titania dispersion solution using a brush and then dried for 5 seconds. These specimens were evaluated in the same manner as in Example 1. The results obtained are shown in Tables 1 and 2.

EXAMPLE 8

50 Capacitor elements were manufactured in the same manner as in Example 1 except that a 0.2% by mass titania (the property of titania was the same as in Example 5) dispersion solution was used in place of the 0.1% by mass alumina dispersion solution in Example 1 and the anode part was dipped in the titania dispersion solution in place of coating with the titania dispersion solution using a brush and then dried for 60 seconds. These specimens were evaluated in the same manner as in Example 1. The results obtained are shown in Tables 1 and 2.

EXAMPLE 9

50 Capacitor elements were manufactured in the same manner as in Example 1 except that a 0.2% by mass titania (the property of titania was the same as in Example 5) dispersion solution was used in place of the 0.1% by mass alumina dispersion solution in Example 1 and the titania dispersion solution was printed with a sponge in place of coating with the titania dispersion solution using a brush and then dried for 60 seconds. These specimens were evaluated in the same manner as in Example 1. The results obtained are shown in Tables 1 and 2.

EXAMPLE 10

50 Capacitor elements were manufactured in the same manner as in Example 1 except for using ferric sulfate in place of ammonium persulfate and using 1,3-dihydroisothianaphthene in place of 3,4- ethylenedioxythiophene in Example 1. These specimens were evaluated in the same manner as in Example 1. The results obtained are shown in Tables 1 and 2.

EXAMPLE 11

50 Capacitor elements were manufactured in the same manner as in Example 1 except that pyrrole was used in place of 3,4-ethylenedioxythiophene in Example 1 and the cathode part was impregnated with a pyrrole solution, dried at 3° C. for 5 minutes, impregnated with an oxidizing solution and then subjected to polymerization at 5° C. for 10 minutes. These specimens were evaluated in the same manner as in Example 1. The results obtained are shown in Tables 1 and 2.

COMPARATIVE EXAMPLE 1

50 Capacitor elements were manufactured in the same manner as in Example 1 except for not performing the coating with a 0.1% by mass alumina dispersion solution in Example 1. These specimens were evaluated in the same manner as in Example 1. The results obtained are shown in Tables 1 and 2.

COMPARATIVE EXAMPLE 2

50 Capacitor elements were manufactured in the same manner as in Example 1 except for using a 1% by mass polyvinyl alcohol dispersion solution in place of the 0.1% by mass alumina dispersion solution in Example 1. These specimens were evaluated in the same manner as in Example 1. The results obtained are shown in Tables 1 and 2.

TABLE 1

| | Concentration of Dispersion Solution (mass %) | Coating Method | Drying Time (sec) | Bonding State |
|---|---|---|---|---|
| Example 1 | 0.1 | brush coating | 60 | ○ |
| Example 2 | 0.5 | brush coating | 60 | ⊙ |
| Example 3 | 1.0 | brush coating | 60 | Δ |
| Example 4 | 3.0 | brush coating | 60 | ⊙ |
| Example 5 | 0.05 | brush coating | 60 | Δ |
| Example 6 | 0.2 | brush coating | 60 | ○ |
| Example 7 | 0.2 | dipping | 5 | ⊙ |
| Example 8 | 0.2 | dipping | 60 | ⊙ |
| Example 9 | 0.2 | sponge printing | 60 | ⊙ |
| Example 10 | 0.1 | brush coating | 60 | ○ |
| Example 11 | 0.1 | brush coating | 60 | ○ |
| Comparative Example 1 | — | — | — | X |
| Comparative Example 2 | 1.0 | brush coating | 60 | X |

TABLE 2

| | Electrostatic Capacitance (μF) | Deviation of Electrostatic Capacitance | LC Yield (%) |
|---|---|---|---|
| Example 1 | 62.90 | 1.77 | 95 |
| Example 2 | 65.58 | 1.59 | 96 |
| Example 3 | 65.01 | 1.79 | 98 |
| Example 4 | 63.86 | 2.12 | 94 |
| Example 5 | 64.64 | 1.67 | 93 |
| Example 6 | 63.72 | 1.91 | 97 |
| Example 7 | 64.63 | 1.48 | 95 |
| Example 8 | 64.07 | 1.56 | 93 |
| Example 9 | 65.22 | 1.87 | 97 |
| Example 10 | 63.55 | 2.01 | 92 |
| Example 11 | 65.43 | 2.24 | 90 |
| Comparative Example 1 | 54.52 | 3.89 | 68 |
| Comparative Example 2 | 38.10 | 5.64 | 73 |

As seen from Table 1, when the anode welding was performed after coating a metal oxide, the bonding state was good and the foil was hardly peeled off irrespective of the concentration or coating means of the coating solution.

As seen from Table 2, when the electrostatic capacitance, the dispersion thereof and the leakage current (LC) were examined, the electrostatic capacitance and the LC yield in Comparative Example 1 (no coating) and Comparative Example 2 (polyvinyl alcohol-coated article) were bad as compared with those where a metal oxide was coated.

INDUSTRIAL APPLICABILITY

As described in the foregoing pages, in the present invention, a metal oxide is coated on the anode part of a capacitor element and then the anode part is subjected to resistance welding, where the anode part is melted due to heat generation at the welding and exhibits good adhesive property, as a result, high peel resistance elevates resistance against pressure and heat at the resin molding or the like, improving production yield (yield), and thus low cost production of capacitors can be realized.

The solid electrolytic capacitor using the capacitor element which is produced by above-mentioned method has capacitor properties such that the electrostatic capacitance is large and the dispersion in the electrostatic capacitance is reduced among individual capacitors as compared with those not subjected to a coating treatment with a metal oxide.

In particular, a formed aluminum foil using for low-voltage solid electrolytic capacitors can be stably bonded and therefore, the practicability is high.

What is claimed is:

1. A method for producing a solid electrolytic capacitor, comprising a step of loading a metal oxide on at least a part of the surface in the anode part of a capacitor element comprising a valve-acting metal substrate having thereon a solid electrolyte, the valve-acting metal substrate having a dielectric film obtained by the electrochemical forming, and a step of stacking and bonding two or more capacitor elements described above.

2. A method for producing a solid electrolytic capacitor, comprising a step of loading a metal oxide on at least a part of the surface in the anode part of a capacitor element comprising a valve-acting metal substrate having thereon a solid electrolyte, the valve-acting metal substrate having a dielectric film obtained by the electrochemical forming, and a step of subsequently stacking and bonding two or more capacitor elements described above.

3. A method for producing a solid electrolytic capacitor, comprising a step of loading a metal oxide on at least a part of the surface in the anode part of a capacitor elements comprising a valve-acting metal substrate having thereon a solid electrolyte, the valve-acting metal substrate having a dielectric film obtained by the electrochemical forming, and a step of stacking two or more capacitor elements described above, mounting these elements on a lead frame and then, bonding the elements to the lead frame.

4. The method for producing a solid electrolytic capacitor as claimed in claim 1, wherein the electrochemical forming is performed at a voltage of less than 20 V.

5. The method for producing a solid electrolytic capacitor as claimed in claim 1, wherein the valve-acting metal substrate is one member selected from the group consisting of aluminum, tantalum, titanium, niobium, and an alloy thereof.

6. The method for producing a solid electrolytic capacitor as claimed in claim 1, wherein the valve-acting metal substrate is an electrochemically formed aluminum foil or plate.

7. The method for producing a solid electrolytic capacitor as claimed in claim 3, wherein the lead frame has a low-melting point metal plating (fusible metal plating) layer whose melting point is lower than that of the valve-acting metal having a thickness in the range of 0.1 to 100 μm on the surface and the anode part of the capacitor elements is mounted on this plating portion.

8. The method for producing a solid electrolytic capacitor as claimed in claim 7, wherein the lead frame is made of a copper or copper alloy based material.

9. The method for producing a solid electrolytic capacitor as claimed in claim 7, wherein the low-melting point metal plating is composed of a substrate nickel plating and a surface tin plating.

10. The method for producing a solid electrolytic capacitor as claimed in claim 1, wherein the metal oxide is a metal oxide of the valve-acting metal constituting the valve-acting metal substrate, and is electrically insulating.

11. The method for producing a solid electrolytic capacitor as claimed in claim 1, wherein the metal oxide is a material other than a metal oxide of the valve-acting metal constituting the valve-acting metal substrate, and is electrically insulating.

12. The method for producing a solid electrolytic capacitor as claimed in claim 10, wherein the metal oxide has an average primary particle size of 100 μm or less.

13. The method for producing a solid electrolytic capacitor as claimed in claim 10, wherein the metal oxide is at least one member selected from the group consisting of alumina, zirconia, titania, zircon, magnesia.spinel, silicon dioxide, and a composite material thereof.

14. The method for producing a solid electrolytic capacitor as claimed in claim 10, wherein the metal oxide forms a metal oxide layer having a thickness in the range of 0.1 to 500 μm on at least a part of the surface in the anode part of a capacitor element.

15. A single plate capacitor element having a metal oxide on at least a part of the surface in the anode part of a capacitor element comprising a valve-acting metal substrate having thereon a solid electrolyte, the valve-acting metal substrate having a dielectric film obtained by the electrochemical forming.

16. A solid electrolytic capacitor obtained by stacking two or more single plate capacitor elements as recited in claim 15.

17. A solid electrolytic capacitor obtained by the production method of a solid electrolytic capacitor as recited in claim 1.

18. The solid electrolytic capacitor as claimed in claim 16, wherein the solid electrolyte comprises a π-electron conjugate polymer.

19. The solid electrolytic capacitor as claimed in claim 18, wherein the π-electron conjugate polymer is a polymer obtained from a heterocyclic 5-membered ring compound.

20. The solid electrolytic capacitor as claimed in claim 19, wherein the heterocyclic 5-membered ring compound is at least one member selected from the group consisting of pyrrole, thiophene, furan, isothianaphthene, 1,3-dihydroisothianaphthene and substitution derivatives thereof.

21. The solid electrolytic capacitor as claimed in claim 19, wherein the heterocyclic 5-membered ring compound is at least one member selected from the group consisting of 3,4-ethylenedioxythiophene and 1,3-dihydroisothianaphthene.

22. The method for producing a solid electrolytic capacitor as claimed in claim 2, wherein the electrochemical Forming is performed at a voltage of less than 20 V.

23. The method for producing a solid electrolytic capacitor as claimed in claim 3, wherein the electrochemical forming is performed at a voltage of less than 20 V.

24. The method for producing a solid electrolytic capacitor as claimed in claim 2, wherein the valve-acting metal substrate is one member selected from the group consisting of aluminum, tantalum, titanium, niobium, and an alloy thereof.

25. The method for producing a solid electrolytic capacitor as claimed in claim 3, wherein the valve-acting metal substrate is one member selected from the group consisting of aluminum, tantalum, titanium, niobium, and an alloy thereof.

26. The method for producing a solid electrolytic capacitor as claimed in claim 2, wherein the valve-acting metal substrate is an electrochemically formed aluminum foil or plate.

27. The method for producing a solid electrolytic capacitor as claimed in claim 3, wherein the valve-acting metal substrate is an electrochemically formed aluminum foil or plate.

28. The method for producing a solid electrolytic capacitor as claimed in claim 2, wherein the metal oxide is a metal oxide of the valve-acting metal constituting the valve-acting metal substrate, and is electrically insulating.

29. The method for producing a solid electrolytic capacitor as claimed in claim 3, wherein the metal oxide is a metal oxide of the valve-acting metal constituting the valve acting metal substrate, and is electrically insulating.

30. The method for producing a solid electrolytic capacitor as claimed in claim 2, wherein the metal oxide is a material other than a metal oxide of the valve-acting metal constituting the valve-acting metal substrate, and is electrically insulating.

31. The method for producing a solid electrolytic capacitor as claimed in claim 3, wherein the metal oxide is a material other than a metal oxide of the valve-acting metal constituting the valve-acting metal substrate, and is electrically insulating.

32. The method for producing a solid electrolytic capacitor as claimed in claim 28, wherein the metal oxide has an average primary particle size of 100 μm or less.

33. The method for producing a solid electrolytic capacitor as claimed in claim 29, wherein the metal oxide has an average primary particle size of 100 μm or less.

34. The method for producing a solid electrolytic capacitor as claimed in claim 11, wherein the metal oxide has an average primary particle size of 100 μm or less.

35. The method for producing a solid electrolytic capacitor as claimed in claim 30, wherein the metal oxide has an average primary particle size of 100 μm or less.

36. The method for producing a solid electrolytic capacitor as claimed in claim 31, wherein the metal oxide has an average primary particle size of 100 μm or less.

37. The method for producing a solid electrolytic capacitor as claimed in claim 28, wherein the metal oxide is at one member selected from the group consisting of alumina, zirconia, titania, zircon, magnesia.spinel, silicon dioxide, and a composite material thereof.

38. The method for producing a solid electrolytic capacitor as claimed in claim 29, wherein the metal oxide is at least one member selected from the group consisting of alumina, zirconia, titania, zircon, magnesia.spinel, silicon dioxide, and a composite material thereof.

39. The method for producing a solid electrolytic capacitor as claimed in claim 11, wherein the metal oxide is at least one member selected from the group consisting of alumina, zirconia, titania, zircon, magnesia.spinel, silicon dioxide, and a composite material thereof.

40. The method for producing a solid electrolytic capacitor as claimed in claim 30, wherein the metal oxide is at least one member selected from the group consisting of alumina, zirconia, titania, zircon, magnesia.spinel, silicon dioxide, and a composite material thereof.

41. The method for producing a solid electrolytic capacitor as claimed in claim 31, wherein the metal oxide is at least one member selected from the group consisting of alumina, zirconia, titania, zircon, magnesia.spinel, silicon dioxide, and a composite material thereof.

42. The method for producing a solid electrolytic capacitor as claimed in claim 28, wherein the metal oxide forms a metal oxide layer having a thickness in the range of 0.1 to 500 $\mu$m on at least a part of the surface in the anode part of a capacitor element.

43. The method for producing a solid electrolytic capacitor as claimed in claim 29, wherein the metal oxide forms a metal oxide layer having a thickness in the range of 0.1 to 500 $\mu$m on at least a part of the surface in the anode part of a capacitor element.

44. The method for producing a solid electrolytic capacitor as claimed in claim 11, wherein the metal oxide forms a metal oxide layer having a thickness in the range of 0.1 to 500 $\mu$m on at least a part of the surface in the anode part of a capacitor element.

45. The method for producing a solid electrolytic capacitor as claimed in claim 30, wherein the metal oxide forms a metal oxide layer having a thickness in the range of 0.1 to 500 $\mu$m on at least a part of the surface in the anode part of a capacitor element.

46. The method for producing a solid electrolytic capacitor as claimed in claim 31, wherein the metal oxide forms a metal oxide layer having a thickness in the range of 0.1 to 500 $\mu$m on at least a part of the surface in the anode part of a capacitor element.

47. A solid electrolytic capacitor obtained by the production method of a solid electrolytic capacitor as recited in claim 3.

48. A solid electrolytic capacitor obtained by the production method of a solid electrolytic capacitor as recited in claim 3.

49. The solid electrolytic capacitor as claimed in claim 17, wherein the solid electrolyte comprises a $\pi$-electron conjugate polymer.

50. The solid electrolytic capacitor as claimed in claim 47, wherein the solid electrolyte comprises a $\pi$-electron conjugate polymer.

51. The solid electrolytic capacitor as claimed in claim 48, wherein the solid electrolyte comprises a $\pi$-electron conjugate polymer.

* * * * *